United States Patent
Gosztyla et al.

(10) Patent No.: US 11,052,936 B2
(45) Date of Patent: Jul. 6, 2021

(54) STEERING COLUMN ASSEMBLY COLLAPSE LIMITER

(71) Applicant: Steering Solutions IP Holding Corporation, Saginaw, MI (US)

(72) Inventors: Damian Z. Gosztyla, Bay City, MI (US); Matthew J T Vincent, Saginaw, MI (US); Robert W. Dubay, Saginaw, MI (US); Robert D. Bueche, Montrose, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 81 days.

(21) Appl. No.: 16/457,062

(22) Filed: Jun. 28, 2019

(65) Prior Publication Data

US 2020/0406952 A1    Dec. 31, 2020

(51) Int. Cl.
*B62D 1/19* (2006.01)
*B62D 1/185* (2006.01)

(52) U.S. Cl.
CPC ............. *B62D 1/192* (2013.01); *B62D 1/185* (2013.01)

(58) Field of Classification Search
CPC ................................. B62D 1/192; B62D 1/185
See application file for complete search history.

(56) References Cited

U.S. PATENT DOCUMENTS

| 2007/0194563 | A1* | 8/2007 | Menjak | B62D 1/195 280/777 |
| 2007/0228716 | A1* | 10/2007 | Menjak | B62D 1/195 280/777 |
| 2009/0033082 | A1* | 2/2009 | Klukowski | F16F 1/361 280/777 |
| 2016/0368524 | A1* | 12/2016 | Tinnin | B62D 1/192 |

* cited by examiner

*Primary Examiner* — Drew J Brown
(74) *Attorney, Agent, or Firm* — Dickinson Wright PLLC

(57) ABSTRACT

A collapsible steering column assembly for a vehicle is provided. The assembly includes a lower jacket. The assembly also includes an upper jacket at least partially received within the lower jacket, the upper jacket telescopingly moveable relative to the lower jacket. The assembly further includes a collapse limiter having an inner strap and an outer strap, the inner strap being at least partially nested within the outer strap, the collapse limiter being moveable with the upper jacket to provide a collapse distance of the collapsible steering column assembly that is constant regardless of a telescopic position of the upper jacket.

16 Claims, 4 Drawing Sheets

STEERING COLUMN ASSEMBLY COLLAPSE LIMITER

BACKGROUND

Currently, many steering column assemblies are equipped with collapse limiters to reduce effects of an impact event. There are several different types and variations of these collapse limiters. Many methods today implement a collapse limiter that has varying collapse distances based on the telescopic position of the steering column assembly. It is desirable to have a mechanism with a collapse distance that is independent of the telescopic position of the steering column.

SUMMARY

According to one aspect of the disclosure, a collapsible steering column assembly for a vehicle is provided. The assembly includes a lower jacket. The assembly also includes an upper jacket at least partially received within the lower jacket, the upper jacket telescopingly moveable relative to the lower jacket. The assembly further includes a collapse limiter having an inner strap and an outer strap, the inner strap being at least partially nested within the outer strap, the collapse limiter being moveable with the upper jacket to provide a collapse distance of the collapsible steering column assembly that is constant regardless of a telescopic position of the upper jacket.

According to another aspect of the disclosure, a collapsible steering column assembly for a vehicle is provided. The assembly includes a lower jacket assembly. The assembly also includes an upper jacket at least partially received within the lower jacket, the upper jacket telescopingly moveable relative to the lower jacket. The assembly further includes a collapse limiter having an inner strap and an outer strap, the inner strap being at least partially nested within the outer strap, the inner strap being attached to the upper jacket, and the outer strap being attached to the lower jacket, the collapse limiter being moveable with the upper jacket to provide a collapse distance of the collapsible steering column assembly that is constant regardless of a telescopic position of the upper jacket.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
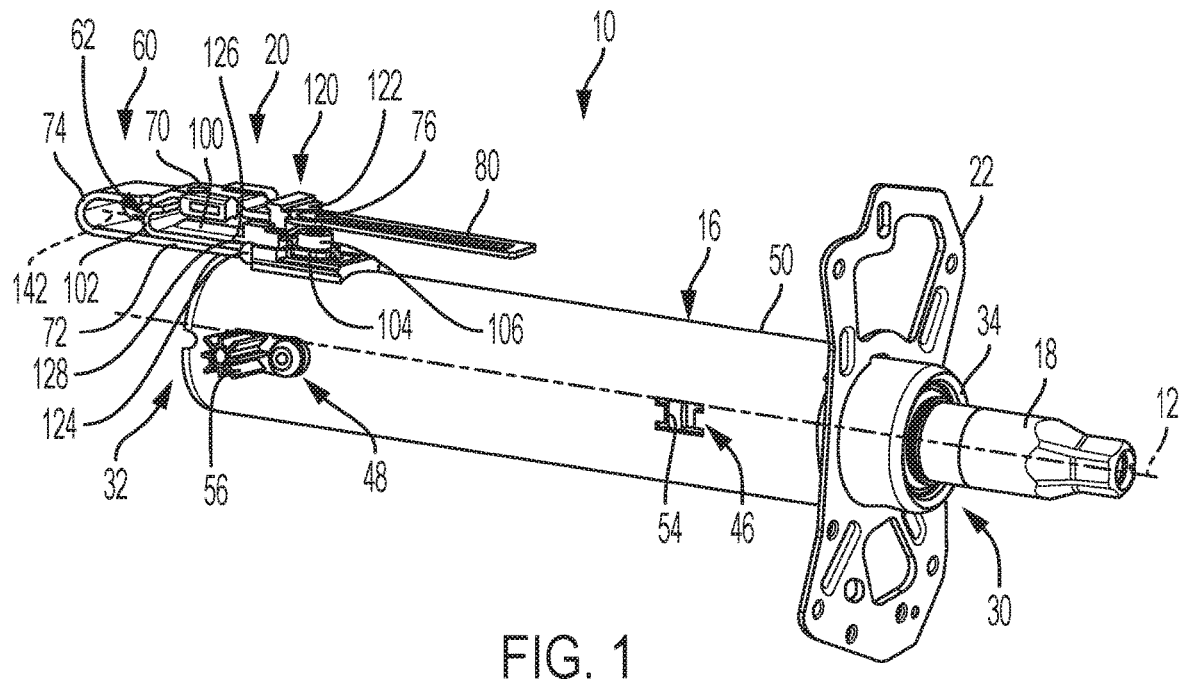
FIG. 1 is a perspective view of the steering column assembly in accordance with one aspect of the disclosure.
Figure 2:
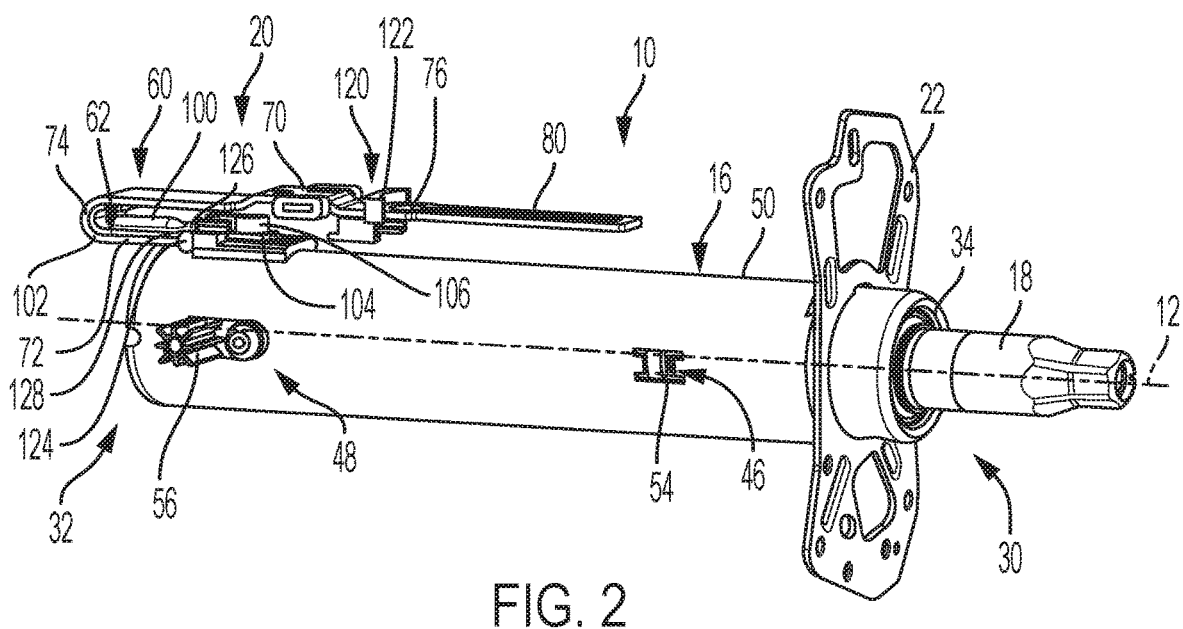
FIG. 2 is a perspective view of the steering column assembly after a collapse event has occurred.

Referring to FIGS. 1 and 2, a steering column assembly 10 is shown. The steering column assembly 10 extends along a steering column axis 12. The steering column assembly 10 is configured as an adjustable telescopic steering column assembly 10 wherein at least a portion of the steering column assembly 10 translates along the steering column axis 12. The steering column assembly 10 includes a lower jacket 14 (See FIGS. 3-8), an upper jacket 16, a steering shaft 18 and a collapse limiter 20.

The upper jacket 16 is connected to a vehicle structure (not shown) by the mounting bracket portion 22. The mounting bracket portion 22 being at a first end 30 of the upper jacket 16 which is opposite a second end 32 of the upper jacket 16. The upper jacket 16 further defines an opening 34 which extends from the first end 30 to the second end 32 of the upper jacket 16. The steering shaft 18 of the steering column assembly 10 is at least partially received within the opening 34 of the upper jacket 16. The lower jacket 14 defines an opening 40 which extends from a first end 42 of the lower jacket 14 to a second end 44 of the lower jacket 14. The opening 40 of the lower jacket 14 at least partially receives the upper jacket 16.

The upper jacket 16 further includes first wall opening 46 and a second wall opening 48. Each wall opening extends between an outer surface 50 and an inner surface 52 (See FIGS. 3-8) of the upper jacket assembly 16. The first wall opening 46 is closer to the first end 30 of the upper jacket assembly 16 and the second wall opening 48 is closer to the second end 32 of the upper jacket assembly 16. A pin 54 it fit into the first wall opening 46 to prevent the upper jacket 16 from rotating out of alignment with the lower jacket 14. A mounting feature 56 passes through the second wall opening 48 to connect the steering column assembly 10 to the vehicle.

The upper jacket 16 is translatable along the steering column axis 12 to telescopically adjust a position of a steering wheel (not shown) coupled to the steering shaft 18.

The collapse limiter 20 is located between the lower jacket 14 and the upper jacket 16. The collapse limiter 20 includes an outer strap 60 and an inner strap 62. The inner strap 62 is at least partially nested within the outer strap 60.

The outer strap 60 has a first portion 70, a second portion 72, and a bend portion 74. The bend portion 74 connects the first portion 70 and the second portion 72. The first portion 70 is parallel in relation to the second portion 72. The first portion 70 of the outer strap 60 includes a first opening 76 through which a first bolt 78 is inserted. The first bolt 78 (See FIGS. 3-8) operatively couples the outer strap 60 to the lower jacket 14. The first portion 70 of the outer strap 60 furthering includes a first set of teeth 80. The first set of teeth 80 engage with a second set of teeth 90 on a lock 92 on a rake mechanism 94 (See FIGS. 3-8) when the steering column assembly 10 is in a locked and non-adjustable position.

The inner strap 62 has a first portion 100 and a bend portion 102. The first portion 100 of the inner strap 62 has a first opening 104 through which a second bolt 106 is inserted attaching the inner strap 62 to the upper jacket 16. The bend portion 102 of the inner strap 62 comes into contact with the bend portion 74 of the outer strap 60 in a collapse event.

The outer strap 60 and the inner strap 62 of the collapse limiter 20 are held in place relative to one another prior to a collapse event with an energy absorption breakaway feature 120. The breakaway feature 120 includes an opening 122 and a tabThe first portion 70 of the outer strap 60 passes through the opening 122 of the breakaway feature 120. The tab 124 of the breakaway feature 120 engages a first notch 126 on the first portion 100 of the inner strap 62 and a second notch 128 on the second portion 72 of the outer strap 60. The breakaway feature has a minimum load necessary for the tab 124 to breakaway allowing for the steering column assembly 10 to the collapse.

Figure 3:
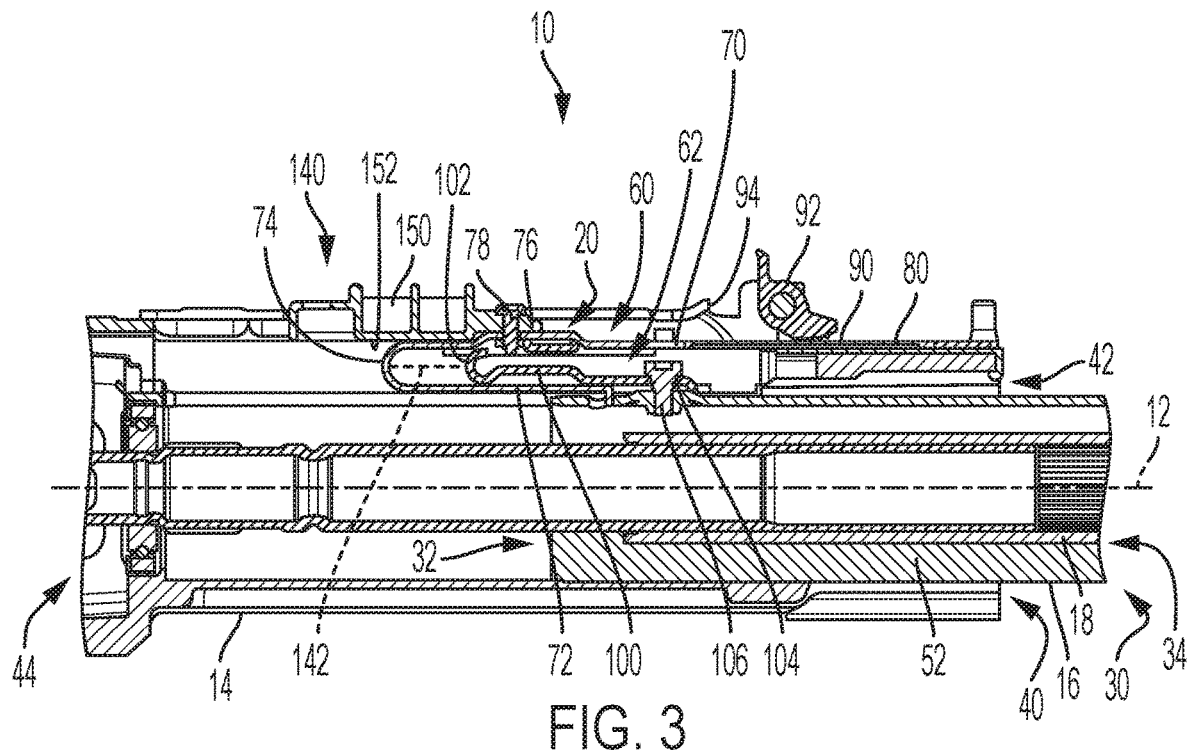
FIG. 3 is a cross sectional view of the steering column assembly in a non-telescoped position.
Figure 4:
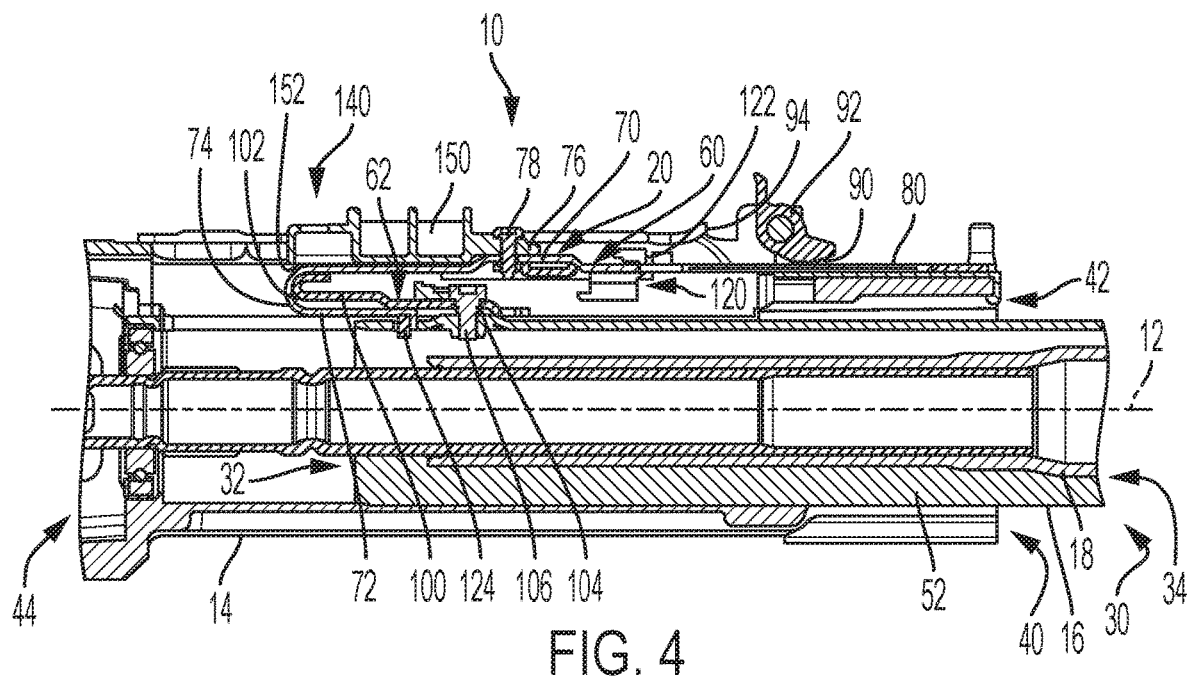
FIG. 4 is a cross sectional view of the steering column assembly in a non-telescoped position after a collapse event has occurred.

Referring to FIGS. 3 and 4, a cross sectional view of the steering column assembly 10 in accordance with the invention in a non-telescoped position 140 is shown. The steering column assembly 10 extends along the steering column axis 12. The steering shaft 18 of the steering column assembly 10 is at least partially received within the opening 34 of the upper jacket 16. The upper jacket 16 is translatable along the steering column axis 12 to telescopically adjust a position of a steering wheel (not shown) coupled to the steering shaft 18. The opening 40 of the lower jacket 14 at least partially receives the upper jacket 16.

The collapse limiter 20 is located between the lower jacket 14 and the upper jacket 16. The collapse limiter is movable with the upper jacket 16 to provide a collapse distance 142 (See FIG. 3) of the steering column assembly 10 that is constant regardless of a telescopic position of the upper the jacket 16.

The outer strap 60 is attached to the lower jacket 14 by the first bolt 78 which is passing through the first opening 76 of the first portion 70 of the outer strap 60. The inner strap 62 is attached to the upper jacket 16 by the second bolt 106 which is passing through the first opening 104 of the first portion 100 of the inner strap 62. The collapse distance 142 is the distance between the bend portion 74 of the outer strap 60 and the bend portion 102 of the inner strap 62.

In the collapse event (See FIG. 4) the tab 124 of the breakaway feature 120 has encountered a minimum load necessary for the tab 124 to breakaway allowing for the steering column assembly 10 to the collapse. The inner strap 62 collapses the entire collapse distance 142 along the steering column axis 12 at a speed that is twice as fast as the collapse of the outer strap 60. The collapse continues until the bend portion 102 of the inner strap 62 is in contact with the bend portion 74 of the outer strap 60. In the scenario depicted the rake mechanism 94 is holding the steering column assembly 10 in a non-telescoped position 140 prior to the collapse event.

The rake mechanism 94 is attached to the outer surface 50 of the lower jacket 14 and is operatively connected to the first portion 70 of the outer strap 60 by a bracket member 150. The bracket member 150 slides along a track 152 on the rake mechanism 94 when the position of the steering column assembly 10 is being adjusted along steering column axis 12. Once the steering column assembly 10 is in the preferred position of a driver (not shown) the second set of teeth 90 on the lock 92 of the rake mechanism 94 engage with the first set of teeth 80 on the first portion 70 of the outer strap 60.

Figure 5:
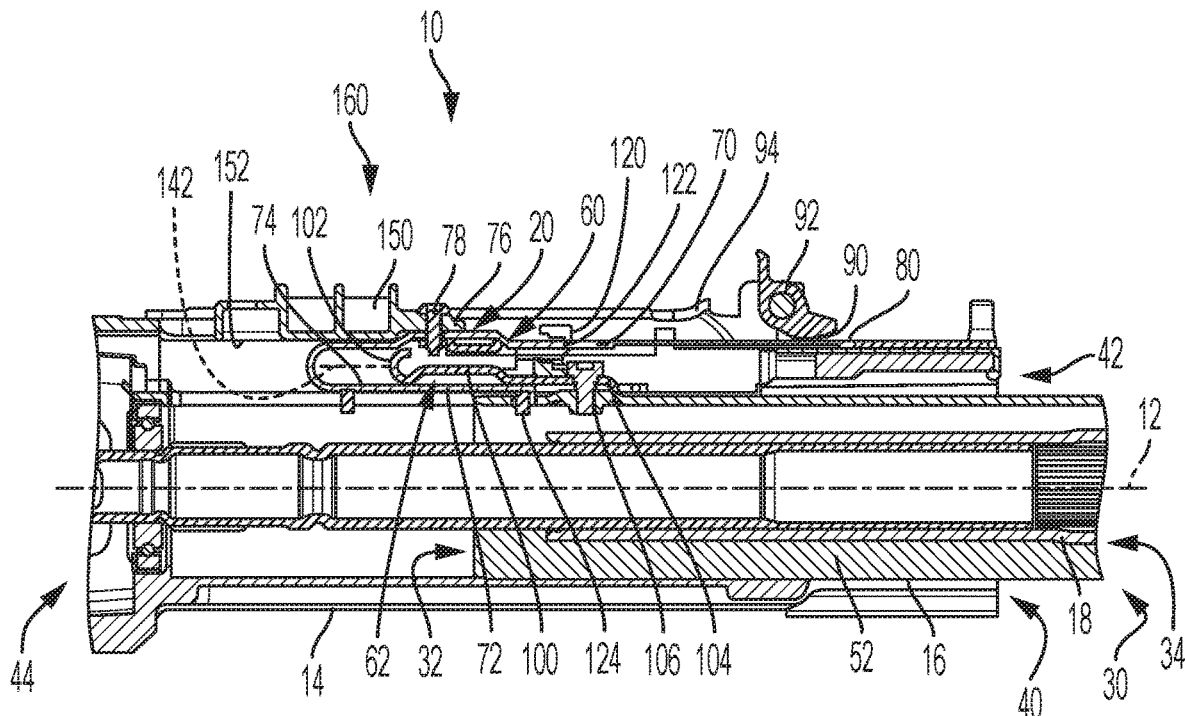
FIG. 5 is a cross sectional view of the steering column assembly in a telescoped in position.
Figure 6:
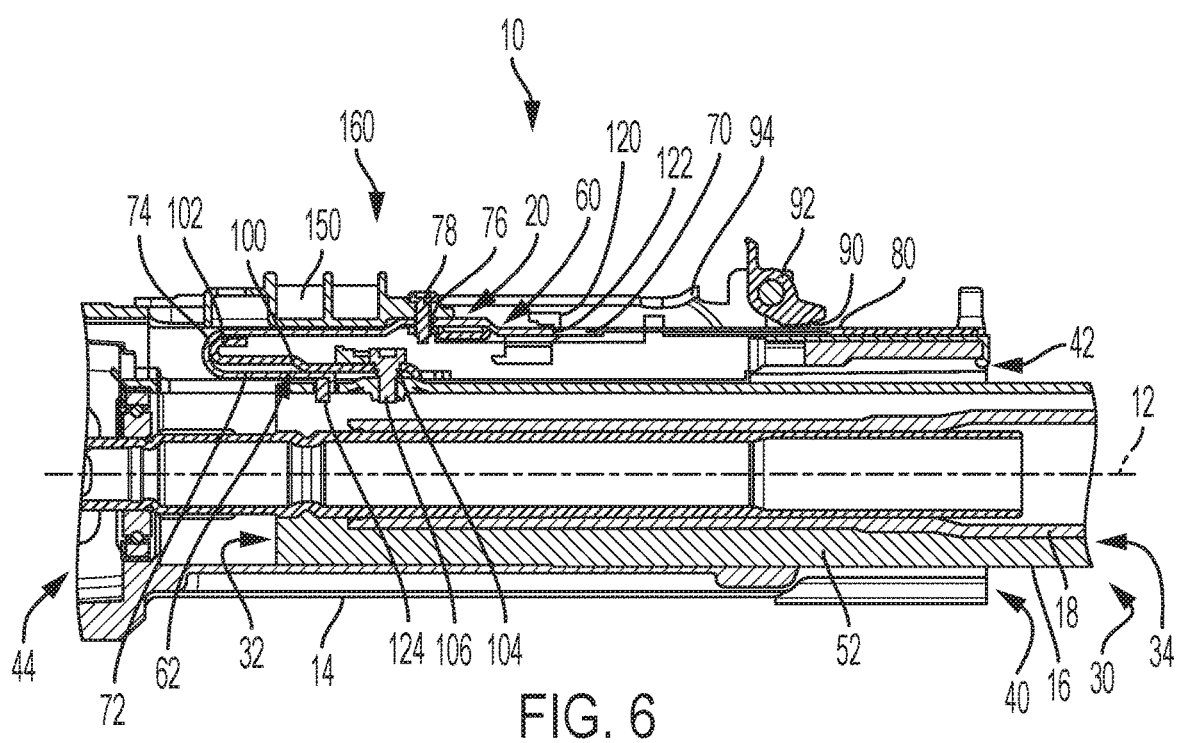
FIG. 6 is a cross sectional view of the steering column assembly in a telescoped in position after a collapse event has occurred.

Referring to FIGS. 5 and 6, a cross sectional view of the steering column assembly in accordance with the invention in a telescoped in position 160 is shown. In the telescoped in position 160 the collapse distance 142 between the outer strap 60 and the inner strap 62 of the collapse limiter 20 remains constant.

In the collapse event (See FIG. 6) the tab 124 of the breakaway feature 120 has encountered a minimum load necessary for the tab 124 to breakaway allowing for the steering column assembly 10 to the collapse. The inner strap 62 collapses the entire collapse distance 142 along the steering column axis 12 at a speed that is twice as fast as the collapse of the outer strap 60. The collapse continues until the bend portion 102 of the inner strap 62 is in contact with the bend portion 74 of the outer strap 60. In the scenario depicted the rake mechanism 94 is holding the steering column assembly 10 in the telescoped in position 160 prior to the collapse event.

Figure 7:
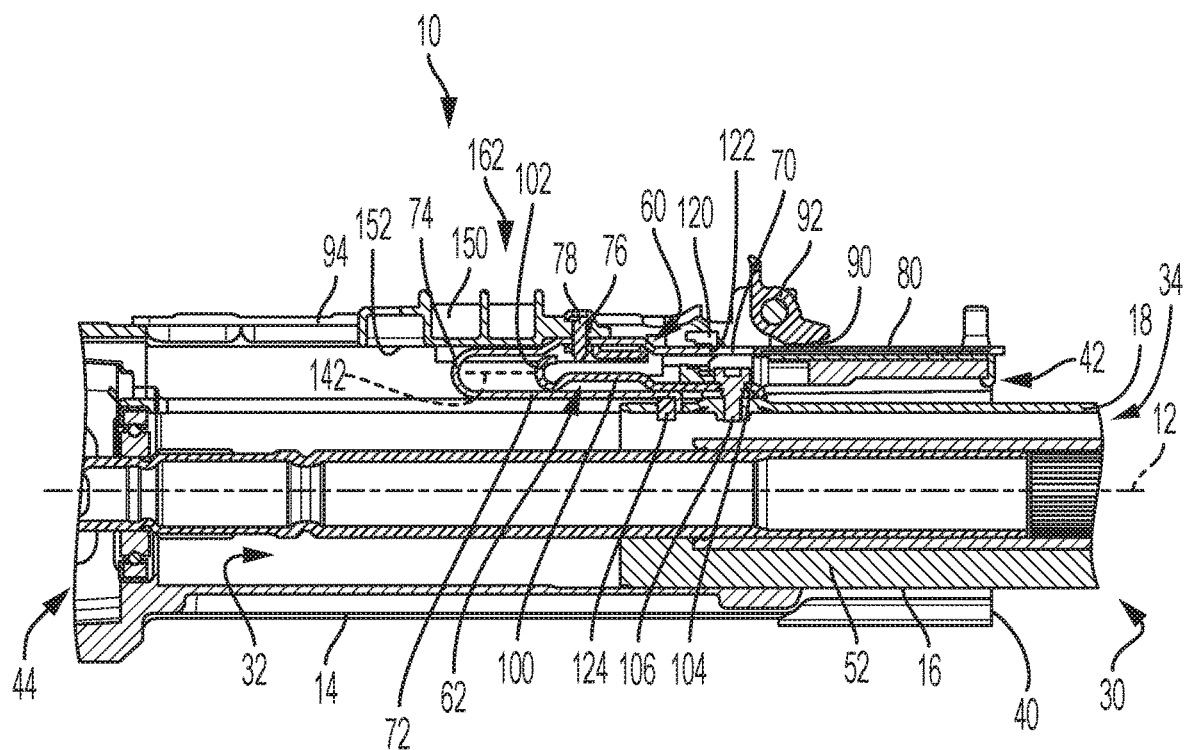
FIG. 7 is a cross sectional view of the steering column assembly in a telescoped out position.
Figure 8:
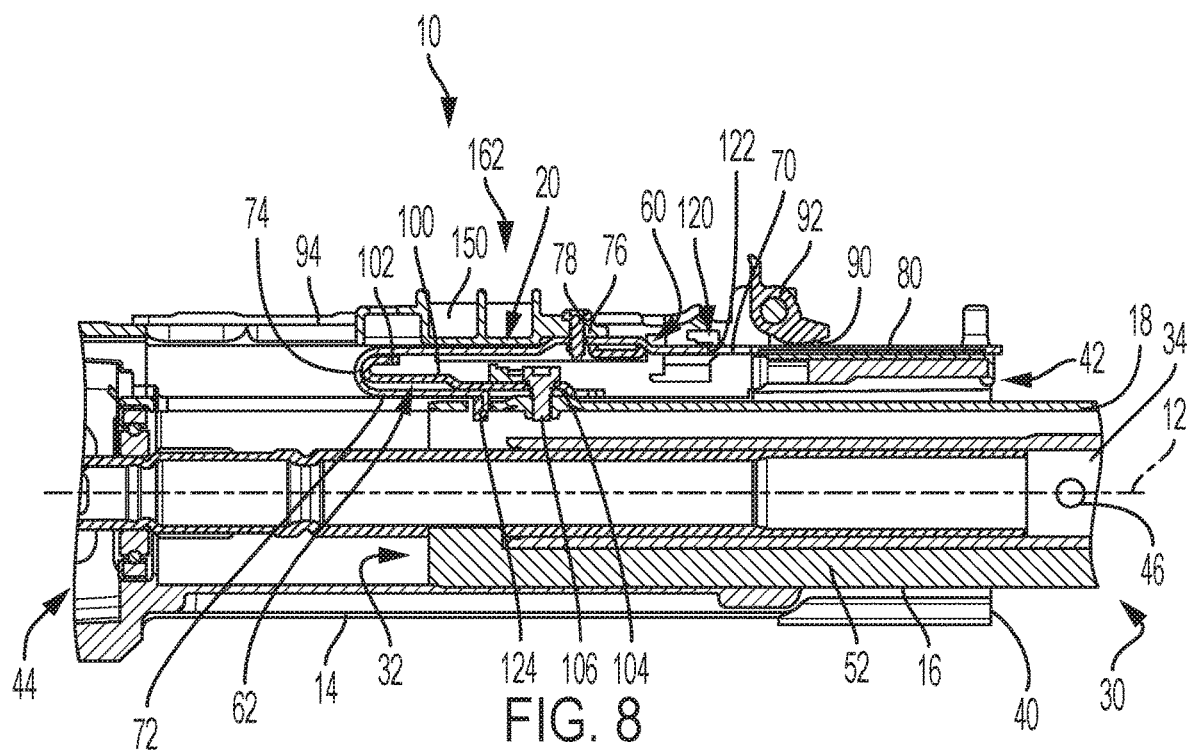
FIG. 8 is a cross sectional view of the steering column assembly in a telescoped in position after a collapse event has occurred.

Referring to FIGS. 7 and 8, a cross sectional view of the steering column assembly in accordance with the invention in a telescoped out position 162 is shown. In the telescoped out position 162 the collapse distance 142 between the outer strap 60 and the inner strap 62 of the collapse limiter 20 remains constant.

In the collapse event (See FIG. 6) the tab 124 of the breakaway feature 120 has encountered a minimum load necessary for the tab 124 to breakaway allowing for the steering column assembly 10 to the collapse. The inner strap 62 collapses the entire collapse distance 142 along the steering column axis 12 at a speed that is twice as fast as the collapse of the outer strap 60. The collapse continues until the bend portion 102 of the inner strap 62 is in contact with the bend portion 74 of the outer strap 60. In the scenario depicted the rake mechanism 94 is holding the steering column assembly 10 in the telescoped out position 162 prior to the collapse event.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the present disclosure, it is claimed:

1. A collapsible steering column assembly for a vehicle comprising:
   a lower jacket;

an upper jacket at least partially received within the lower jacket, the upper jacket telescopingly moveable relative to the lower jacket; and a collapse limiter having an inner strap and an outer strap, the inner strap being at least partially nested within the outer strap, the collapse limiter being moveable with the upper jacket to provide a collapse distance of the collapsible steering column assembly that is constant regardless of a telescopic position of the upper jacket, wherein the inner strap has a first portion and a bend portion, wherein the bend portion of the inner strap comes into contact with the bend portion of the outer strap in a collapse event.

2. The collapsible steering column assembly of claim 1, wherein the collapse limiter is located between the lower jacket and the upper jacket.

3. The collapsible steering column assembly of claim 1, wherein the outer strap has a first portion, a second portion, and a bend portion connecting the first portion and second portion.

4. The collapsible steering column assembly of claim 3, wherein the first portion of the outer strap has an opening through which a first bolt operatively couples the outer strap to the lower jacket.

5. The collapsible steering column assembly of claim 3, wherein the first portion of the outer strap has a first set of teeth, the first set of teeth engaging with a second set of teeth on a rake mechanism.

6. The collapsible steering column assembly of claim 5, wherein the rake mechanism is attached to the lower jacket of the steering column assembly.

7. The collapsible steering column assembly of claim 1, wherein the first portion of the inner strap has a first opening through which a second bolt is inserted attaching the inner strap to the upper jacket assembly.

8. A collapsible steering column assembly for a vehicle comprising:

a lower jacket;

an upper jacket at least partially received within the lower jacket, the upper jacket telescopingly moveable relative to the lower jacket; and a collapse limiter having an inner strap and an outer strap, the inner strap being at least partially nested within the outer strap, the collapse limiter being moveable with the upper jacket to provide a collapse distance of the collapsible steering column assembly that is constant regardless of a telescopic position of the upper jacket, wherein the collapse limiter is held in place by an energy absorption breakaway feature, the breakaway feature having a minimum load necessary for the column to collapse.

9. A collapsible steering column assembly for a vehicle comprising:

a lower jacket assembly;

an upper jacket at least partially received within the lower jacket, the upper jacket telescopingly moveable relative to the lower jacket, and a collapse limiter having an inner strap and an outer strap, the inner strap being at least partially nested within the outer strap, the inner strap being attached to the upper jacket, and the outer strap being attached to the lower jacket, the collapse limiter being moveable with the upper jacket to provide a collapse distance of the collapsible steering column assembly that is constant regardless of a telescopic position of the upper jacket, wherein the collapse limiter is held in place by an energy absorption breakaway feature, the breakaway feature having a minimum load necessary for the column to collapse.

10. The collapsible steering column assembly of claim 9, wherein the collapse limiter is located between the lower jacket and the upper jacket.

11. The collapsible steering column assembly of claim 9, wherein the outer strap has a first portion, a second portion, and a bend portion connecting the first portion and second portion.

12. The collapsible steering column assembly of claim 11, wherein the first portion of the outer strap has an opening through which a first bolt operatively couples the outer strap to the lower jacket.

13. The collapsible steering column assembly of claim 11, wherein the first portion of the outer strap has a first set of teeth, the first set of teeth engaging with a second set of teeth on a rake mechanism.

14. The collapsible steering column assembly of claim 13, wherein the rake mechanism is attached to the lower jacket of the steering column assembly.

15. A collapsible steering column assembly for a vehicle comprising:

a lower jacket assembly;

an upper jacket at least partially received within the lower jacket, the upper jacket telescopingly moveable relative to the lower jacket; and a collapse limiter having an inner strap and an outer strap, the inner strap being at least partially nested within the outer strap, the inner strap being attached to the upper jacket, and the outer strap being attached to the lower jacket, the collapse limiter being moveable with the upper jacket to provide a collapse distance of the collapsible steering column assembly that is constant regardless of a telescopic position of the upper jacket, wherein the inner strap has a first portion and a bend portion, wherein the bend portion of the inner strap comes into contact with the bend portion of the outer strap in a collapse event.

16. The collapsible steering column assembly of claim 15, wherein the first portion of the inner strap has a first opening through which a second bolt is inserted attaching the inner strap to the upper jacket assembly.

\* \* \* \* \*